(12) United States Patent
Aksyuk et al.

(10) Patent No.: US 6,998,758 B2
(45) Date of Patent: Feb. 14, 2006

(54) DEFORMABLE MEMS MIRROR WITH MEMBRANE ACTUATED BY APPLICATION OF TORQUE

(75) Inventors: Vladimir A. Aksyuk, Piscataway, NJ (US); Omar D. Lopez, Summit, NJ (US); Flavio Pardo, New Providence, NJ (US); Maria E. Simon, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 172 days.

(21) Appl. No.: 10/455,082

(22) Filed: Jun. 5, 2003

(65) Prior Publication Data

US 2004/0245888 A1 Dec. 9, 2004

(51) Int. Cl.
*H02N 1/00* (2006.01)
*G02B 26/10* (2006.01)
*G02B 26/08* (2006.01)

(52) U.S. Cl. .................... 310/309; 359/224; 359/226; 359/291; 385/18

(58) Field of Classification Search ............... 310/309; 318/116; 385/18; 359/223–225, 291
See application file for complete search history.

(56) References Cited

U.S. PATENT DOCUMENTS

| 5,501,893 | A | | 3/1996 | Laermer et al. ............ 428/161 |
|---|---|---|---|---|
| 5,629,790 | A | | 5/1997 | Neukermans et al. ....... 359/198 |
| 5,757,536 | A | * | 5/1998 | Ricco et al. ................ 359/224 |
| 5,862,003 | A | * | 1/1999 | Saif et al. ................... 359/871 |
| 5,920,421 | A | * | 7/1999 | Choi .......................... 359/291 |
| 6,108,121 | A | | 8/2000 | Mansell et al. ............. 359/291 |
| 6,201,631 | B1 | | 3/2001 | Greywall .................... 359/245 |
| 6,293,680 | B1 | | 9/2001 | Bruns ......................... 359/849 |
| 6,384,952 | B1 | * | 5/2002 | Clark et al. ................ 359/224 |
| 6,512,625 | B1 | * | 1/2003 | Mei et al. ................... 359/290 |
| 6,631,246 | B1 | * | 10/2003 | Ford et al. .................. 398/158 |
| 6,661,561 | B1 | * | 12/2003 | Fitzpatrick et al. ......... 359/291 |
| 6,865,313 | B1 | * | 3/2005 | Mao et al. ................... 385/18 |
| 2004/0245888 | A1 | * | 12/2004 | Aksyuk et al. ............. 310/309 |
| 2005/0134955 | A1 | * | 6/2005 | Greywall et al. ........... 359/291 |

* cited by examiner

*Primary Examiner*—Karl Tamai (57) ABSTRACT

A MEMS device having a deformable mirror. In a representative embodiment, the MEMS device includes a deformable membrane supporting a plurality of light-reflecting segments that form the deformable mirror. One or more actuators, at least one of which is configured to apply torque to a side of the membrane, are used to deform the membrane. Membrane deformation causes the segments to change orientation and thereby change the shape of the minor. A representative MEMS device of the invention enables segment displacements in two directions and thereby realizes effective mirror curvature values in the range from about −2 $mm^{-1}$ to about +2 $mm^{-1}$.

27 Claims, 8 Drawing Sheets

DEFORMABLE MEMS MIRROR WITH MEMBRANE ACTUATED BY APPLICATION OF TORQUE

CROSS-REFERENCE TO RELATED APPLICATIONS

The subject matter of this application is related to that of U.S. patent application Ser. No. 10/394,359, filed Mar. 21, 2003, entitled "Dispersion Compensator," and referred to hereafter as "the Neilson application," the teachings of which are incorporated herein by reference.

BACKGROUND OF THE INVENTION

1. Field of the Invention

The present invention relates to optical communication equipment and, more specifically, to micro-electromechanical devices for use in such equipment.

2. Description of the Related Art

Adaptive optics is a field of optics dedicated to the improvement of optical signals using information about signal distortions introduced by the environment in which the optical signals propagate. An excellent introductory text on the subject is given in "Principles of Adaptive Optics" by R. K. Tyson, Academic Press, San Diego, 1991, the teachings of which are incorporated herein by reference.

Interest in the field of adaptive optics has increased in recent years due to the demand for various adaptive optical elements for use in advanced applications such as atmospheric imaging, optical signal processing, optical data storage, high-power lasers, etc. A representative adaptive optical element is a deformable mirror that may be used, for example, in an optical system designed to compensate for signal distortions introduced in an optical fiber. An appropriate sensor measures the distortions and generates feedback for the deformable mirror. Based on the feedback, the mirror is deformed such that the distortions are significantly reduced, thus improving receiver performance.

A typical deformable mirror of the prior art is a deformable membrane, the shape of which is controlled by an array of underlying electrostatic actuators, e.g., electrodes. However, the deformation induced by such actuators is typically unipolar. That is, the electrodes can flex the membrane in one direction (i.e., toward these electrodes) only. As a result, the types of distortions correctable with prior art membrane mirrors are limited. In addition, for a membrane mirror having a lateral dimension of about 100 $\mu$m, the maximum deformation amplitude is on the order of 1 $\mu$m, which puts a corresponding limit on the range of distortions that can be corrected.

SUMMARY OF THE INVENTION

Problems in the prior art are addressed, in accordance with the principles of the present invention, by a MEMS device having a deformable mirror. In a representative embodiment, the MEMS device includes a deformable membrane supporting a plurality of light-reflecting segments that form the deformable mirror. One or more actuators, at least one of which is configured to apply torque to a side of the membrane, are used to deform the membrane. Membrane deformation causes the segments to change orientation and thereby change the shape of the mirror. A representative MEMS device of the invention enables segment displacements in two directions and thereby realizes effective mirror curvature values in the range from about $-2$ mm$^{-1}$ to about $+2$ mm$^{-1}$.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
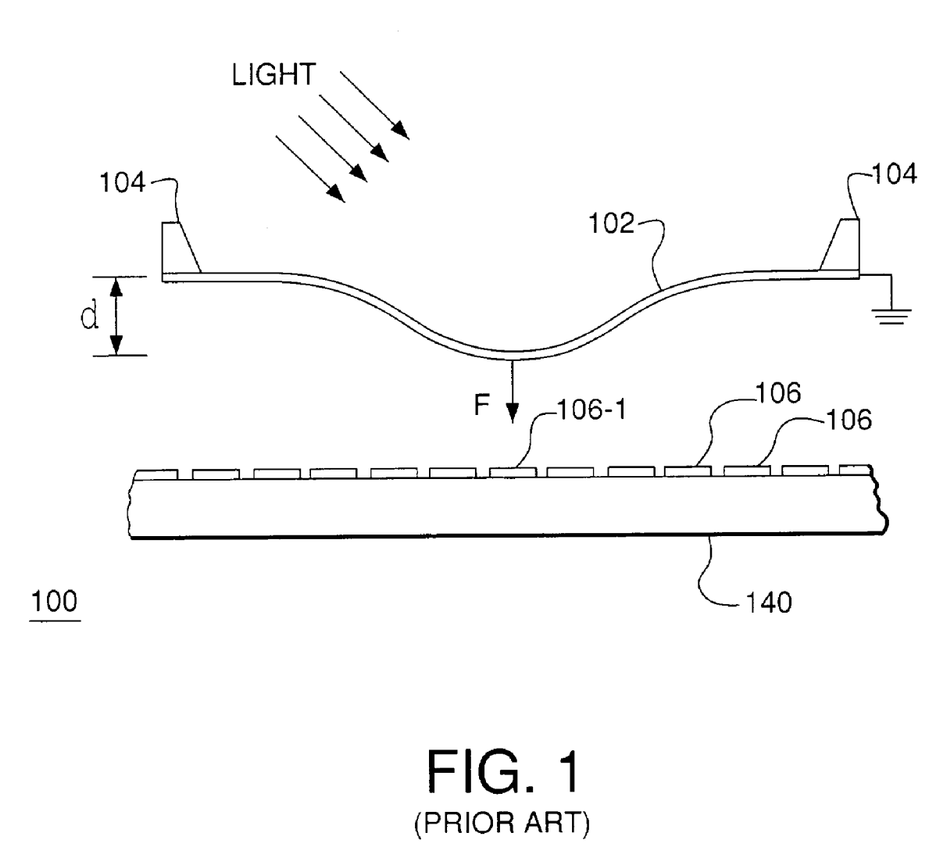
FIG. 1 schematically shows a cross section of a prior art device having a deformable membrane mirror.

FIG. 1 schematically shows a representative device 100 of the prior art. Device 100 includes (i) a deformable light-reflecting membrane 102 mounted on a support structure 104 and (ii) an array of electrodes 106 located beneath membrane 102 on a substrate 140. Each electrode 106 can be individually biased by applying a voltage differential between that electrode and membrane 102 (typically at ground potential). For example, when electrode 106-1 is biased, an attractive electrostatic force (F) is exerted between that electrode and membrane 102 causing the membrane, initially flat, to deform into the shape indicated in FIG. 1.

As shown in FIG. 1, biasing one or more electrodes 106 causes membrane 102 to move toward the electrodes and thereby adopt a "concave-down" shape that can be characterized as substantially having, e.g., a positive curvature value, where curvature is quantified as a reciprocal curvature radius. An additional array of electrodes located above membrane 102 would be necessary to produce a "concave-up" shape corresponding to negative curvature. However, these additional electrodes would be in the optical path of light impinging upon membrane 102 and thereby would attenuate the light and/or introduce light-wave distortions. In addition, the maximum deformation amplitude (d) for membrane 102 is typically on the order of 1 $\mu$m, which puts a corresponding limit on the range of optical signal distortions correctable with device 100. It is therefore desirable to have a device having a deformable mirror that can adopt shapes corresponding to positive and negative curvatures and/or has a greater deformation range than membrane 102.

Figure 2A:
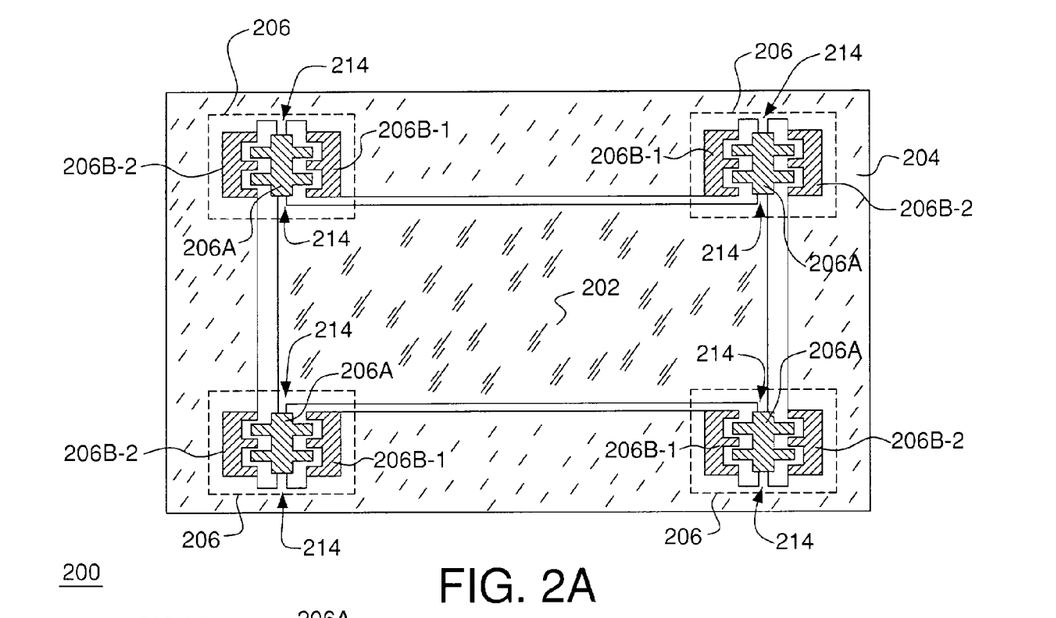
FIGS. 2A–B schematically show a MEMS device according to one embodiment of the present invention.
Figure 2B:
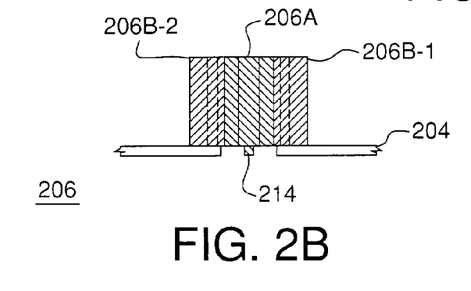

FIGS. 2A–B schematically show a MEMS device 200 according to one embodiment of the present invention. More specifically, FIG. 2A shows a top view of device 200, and FIG. 2B shows a side view of an electrostatic comb drive actuator 206 used in device 200. Device 200 has (i) a deformable light-reflecting membrane 202 connected to a support structure 204 and (ii) four comb drive actuators 206, each located at a corner of membrane 202. Each comb drive actuator 206 has (i) a mobile portion 206A rotatably connected between support structure 204 and a side of membrane 202 and (ii) an immobile portion 206B fixedly attached to the support structure. Each mobile portion 206A is supported by a pair of torsional members 214, one member attached between the bottom of the mobile portion (in the projection shown in FIG. 2B) and support structure 204 and the other member attached between the bottom of the mobile portion and membrane 202. Each pair of members 214 attached to a mobile portion 206A defines a rotation axis for that portion. Each immobile portion 206B includes two electrodes 206B-1 and 206B-2, each of which can be independently biased relative to mobile portion 206A (typically held at ground potential).

Operation of each comb drive actuator 206 can be briefly described as follows. When no voltage is applied between portion 206A and electrode(s) 206B of comb drive actuator 206, mobile portion 206A is in its initial (rest) position shown in FIG. 2B. When voltage is applied, for example, between mobile portion 206A and electrode 206B-1, it exerts an attractive electrostatic force between the two causing the mobile portion to move toward the electrode. However, since mobile portion 206 is anchored at one side to members 214, the electrostatic force causes the mobile portion to rotate about the members in the clockwise direction (for the projection shown in FIG. 2B). This rotation applies torque to the corresponding side of membrane 202 at the area of attachment of member 214, which deforms the membrane. An elastic restoring force generated by the deformed membrane provides a counteracting force for actuator 206. When the voltage is removed, the restoring force returns mobile portion 206A back to the initial position. Similarly, when voltage is applied between mobile portion 206A and electrode 206B-2, the mobile portion will rotate about members 214 in the counterclockwise direction.

Figure 3A:
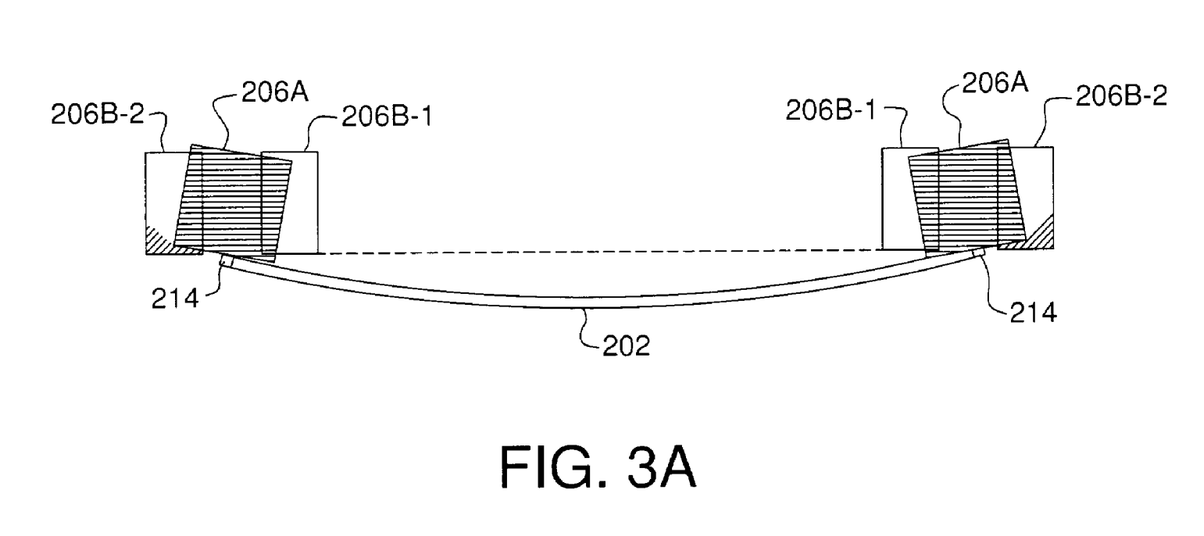
FIGS. 3A–B schematically show cross-sections of the MEMS device of FIG. 2 illustrating representative membrane deformations.
Figure 3B:
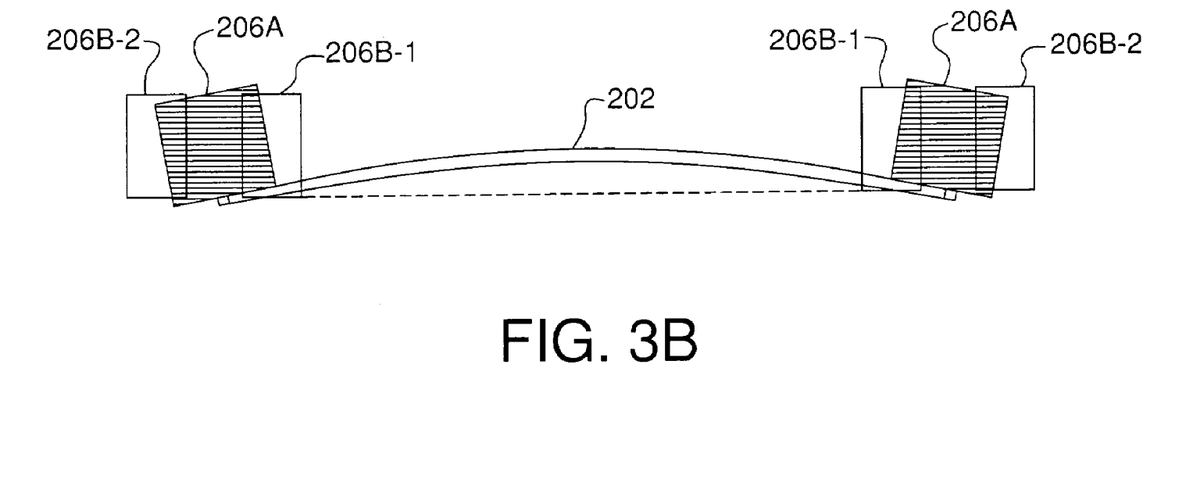

FIGS. 3A–B schematically show a cross-section of device 200 illustrating how membrane 202 can be deformed using comb drive actuators 206. More specifically, FIGS. 3A–B illustrate representative membrane deformations corresponding to membrane displacements in either of two opposing directions along the membrane normal with respect to the initial membrane position indicated by the dashed lines. The shapes shown in FIGS. 3A–B correspond to positive and negative curvatures, respectively. For example, when, for each comb drive actuator 206, a voltage differential is applied between mobile portion 206A and electrode 206B-1, each mobile portion rotates about corresponding members 214 in the corresponding direction causing membrane 202 to flex down and assume a concave-down (positive curvature) shape shown in FIG. 3A. Similarly, when, for each comb drive actuator 206, voltage is applied between mobile portion 206A and electrode 206B-2, membrane 202 flexes up and assumes a concave-up (negative curvature) shape shown in FIG. 3B. As can be appreciated by one skilled in the art, different one- or two-dimensional shapes of membrane 202, e.g., having areas corresponding to positive and negative curvatures and/or up and down displacements, can be produced by biasing different selected electrodes 206B in different comb drive actuators 206.

Figure 4A:
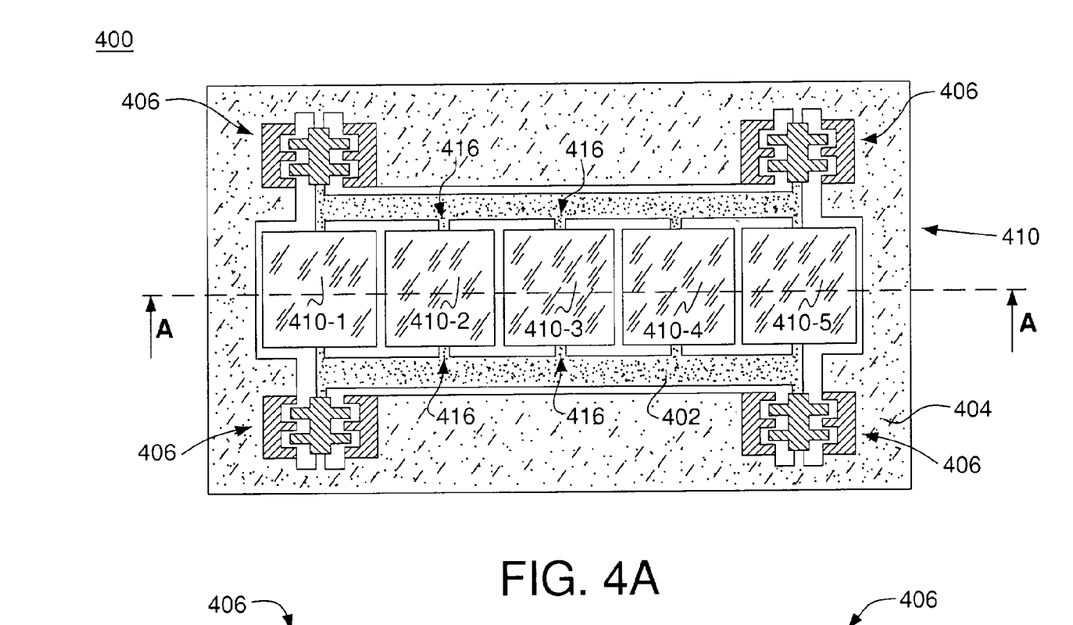
FIGS. 4A–B schematically show top and cut-away side views, respectively, of a MEMS device according to another embodiment of the present invention.
Figure 4B:
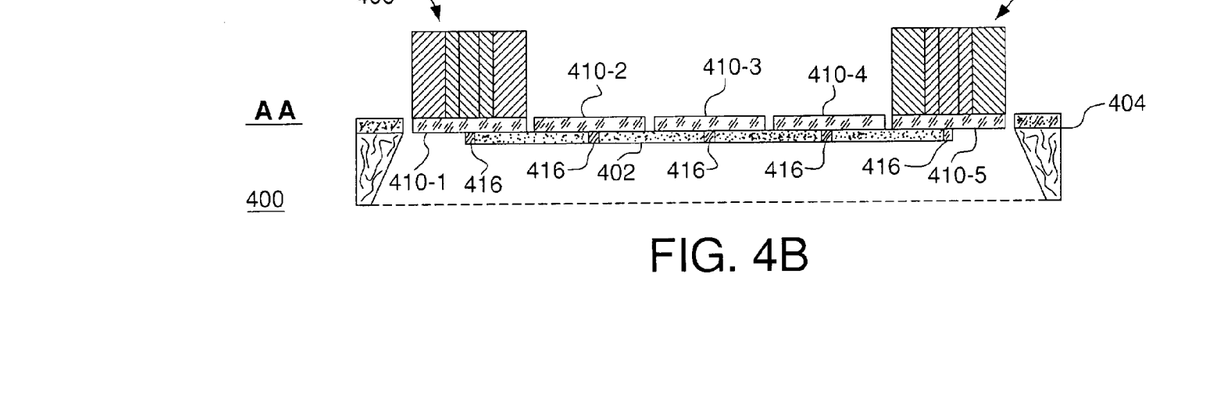

FIGS. 4A–B schematically show top and cut-away side views, respectively, of a MEMS device 400 according to another embodiment of the present invention. Device 400 is similar to device 200 (FIG. 2) and has (i) a deformable membrane 402 mounted on a support structure 404 and (ii) four comb drive actuators 406, each similar to comb drive actuator 206. Deformable membrane 402 can be deformed similar to deformable membrane 202 (FIG. 2) using comb drive actuators 406.

In one embodiment, membrane 402 has an opening configured to accommodate a segmented plate 410 illustratively shown in FIG. 4 as having five square segments 410-1–410-5. Each segment 410-$i$ is supported by a pair of rods 416, each rod attached between the segment and membrane 402. When membrane 402 is deformed using comb drive actuators 406, for example, as described above for membrane 202 (FIGS. 2–3), the orientation of some rods 416, e.g., with respect to support structure 404 will change to conform to the deformed shape of the membrane. Due to this orientation change, the corresponding segment(s) 410-$i$ will also change orientation with respect to structure 404 and thereby change the shape of segmented plate 410. However, due to the relatively small width of each rod 416 compared to that of the corresponding segment 410-$i$, the segments will remain substantially flat and free of deformations. In one embodiment, segmented plate 410 forms a segmented mirror and is preferably fabricated using a different (layer of) material than that of deformable membrane 402.

Figure 5:
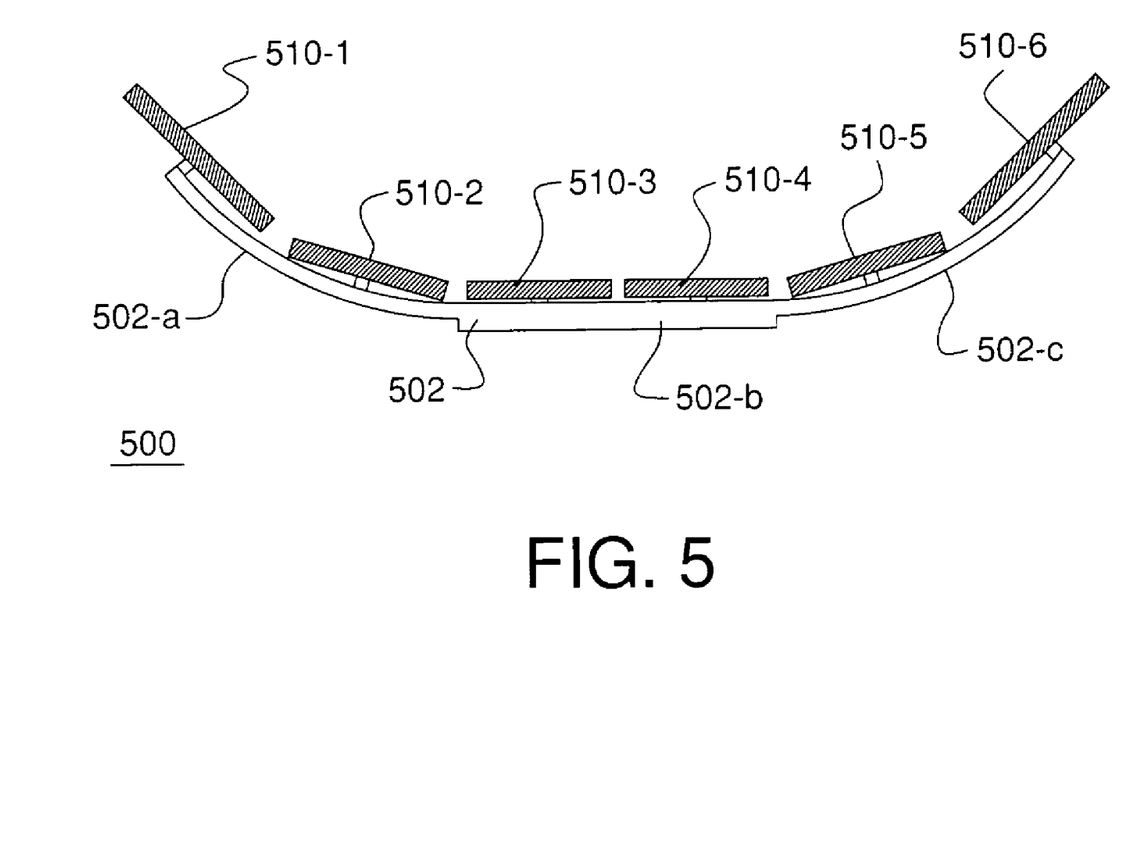
FIG. 5 schematically shows a side view of an assembly that can be used in the device of FIG. 4 according to one embodiment of the present invention.

FIG. 5 schematically shows a side view of an assembly 500 that can be used in device 400 of FIG. 4 instead of membrane 402 and plate 410 according to one embodiment of the present invention. Assembly 500 includes a deformable membrane 502 configured to support a segmented plate 510. In FIG. 5, membrane 502 and plate 510 are depicted in a deformed state. Plate 510 has six segments 510-1–510-6 and membrane 502 has three sections 502$a$–$c$, where segments 510-1–510-2, 510-3–510-4, and 510-5–510-6 are attached to sections 502$a$, 502$b$, and 502$c$, respectively, each section having a different thickness. More specifically, the thickness of middle section 502$b$ is greater than that of either of end sections 502$a$ and 502$c$. Due to the greater thickness, section 502$b$ is stiffer and more difficult to deform than the other two sections. As a result, when membrane 502 is deformed, segments 510-3 and 510-4 attached to section 502$b$ are less susceptible to orientation change than those attached to sections 502$a$ and 502$c$.

In one embodiment, the thickness profile of a deformable membrane is appropriately selected to control the shape that the membrane (and therefore the corresponding segmented plate) will adopt upon deformation. In addition to or instead of choosing the thickness profile, the shape of the deformed membrane can be controlled by appropriately varying stiffness of the membrane along its length using one or more of the following methods: (1) varying the cross-section and/or layout of the membrane, (2) varying the chemical composition of the membrane, (3) modifying the surface of the membrane, etc.

Figure 6:
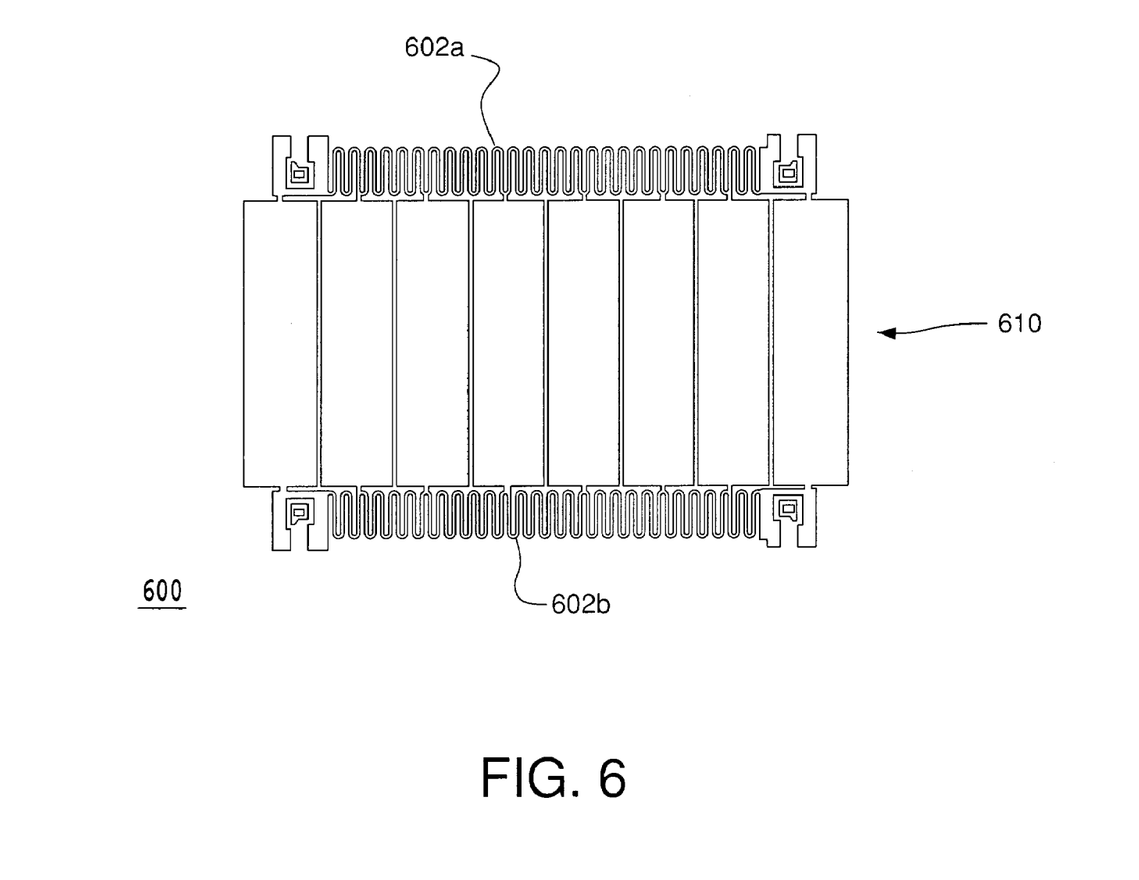
FIG. 6 schematically shows a top view of an assembly that can be used in the device of FIG. 4 according to another embodiment of the present invention.

FIG. 6 schematically shows a top view of an assembly 600 that can be used in device 400 of FIG. 4 instead of membrane 402 and plate 410 according another embodiment of the present invention. Assembly 600 includes two serpentine springs 602$a$–$b$ configured to support a segmented plate 610 having eight rectangular segments. Functionally, each of springs 602$a$–$b$ is similar to a portion of deformable membrane 402 (FIG. 4) located on one side of segmented plate 410. However, in contrast with membrane 402 and segmented plate 410 of FIG. 4, springs 602$a$–$b$ and segmented plate 610 of FIG. 6 are preferably fabricated using a single layer of material, e.g., silicon. As can be appreciated by one skilled in the art, each spring 602 can be designed to have a spring constant (stiffness) selected from a relatively wide range of values, for example, by appropriately selecting the number and size of U-shaped elements in the spring. In addition, springs 602a–b may be modified as described above to have variable stiffness along the spring length. In one embodiment, assembly 600 enables shape changes of segmented plate 610 corresponding to segment displacements of about ±10 µm and effective curvature values in the range from about −2 mm$^{-1}$ to about +2 mm$^{-1}$ for an actuator to actuator distance of about 200 microns.

FIGS. 7A–E illustrate representative fabrication steps of a MEMS device 700 according to one embodiment of the present invention. More specifically, FIGS. 7A–E show cross-sectional views of the device during those fabrication steps.

Figure 7A:
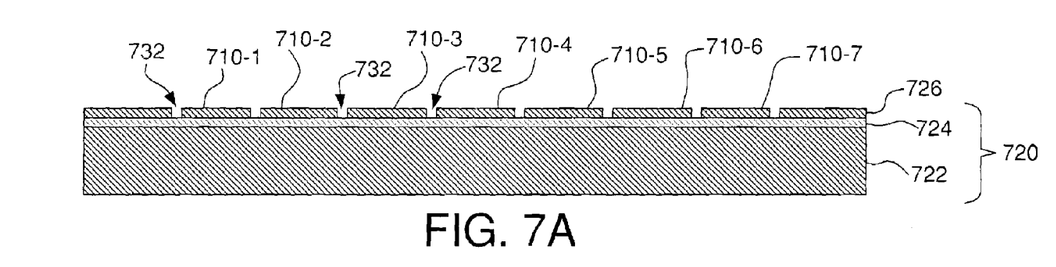
FIGS. 7A–E illustrate representative fabrication steps of a MEMS device according to one embodiment of the present invention.

Referring to FIG. 7A, in one embodiment, fabrication of device 700 begins with a silicon-on-insulator (SOI) wafer 720 having (i) two silicon layers, i.e., substrate layer 722 and overlayer 726, and (ii) an insulating silicon oxide layer 724, which electrically isolates overlayer 726 from substrate layer 722. Segmented plate 710 (having seven segments 710-1–710-7), serpentine springs (e.g., similar to springs 602a–b of FIG. 6, not shown), torsional members (e.g., similar to members 214 of FIG. 2, not shown), and rods (e.g., similar to rods 416 of FIG. 4, not shown) are defined in overlayer 726 of wafer 720 using grooves 732 that may be formed using reactive etching, which stops at layer 724.

Figure 7B:
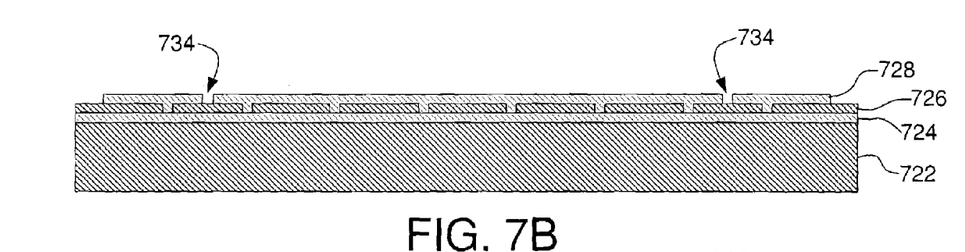

Referring to FIG. 7B, first, a thin silicon oxide layer 728 is deposited onto overlayer 726 of wafer 720. Then, layer 728 is patterned and etched, for example, to form openings 734 for future via structures providing electrical contact between movable portions 706A of comb drive actuators 706 (not formed yet) and layer 726. The processing illustrated in FIG. 7B can be implemented using reactive etching, which stops at silicon layer 726.

Figure 7C:
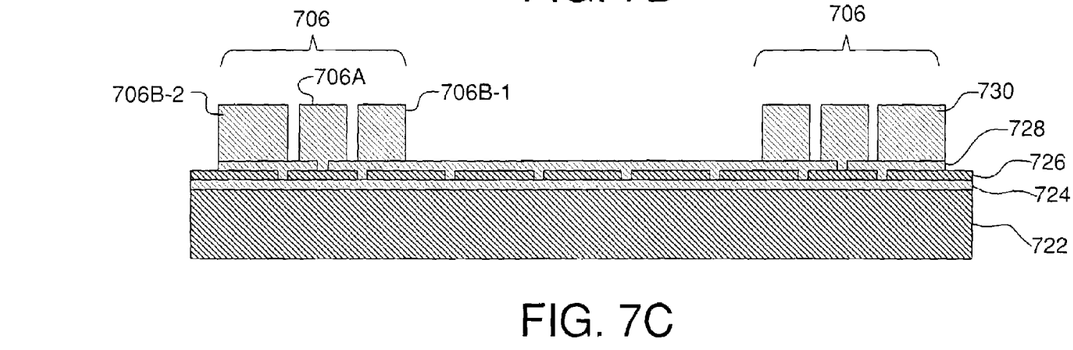

Referring to FIG. 7C, first, a relatively thick poly-silicon layer 730 is deposited over oxide layer 728 and openings 734. Then, layer 730 is patterned and etched to define comb drive actuators 706 (similar to actuators 206, FIG. 2), each including movable portion 706A and two electrodes 706B-1 and 706B-2. The processing illustrated in FIG. 7B can be implemented using chemical vapor deposition and reactive etching, which stops at silicon oxide layer 728.

Figure 7D:
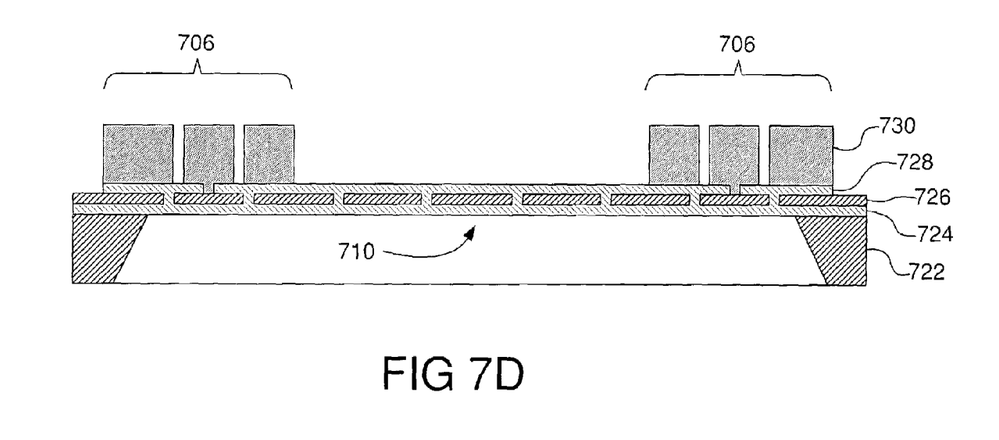
Figure 7E:
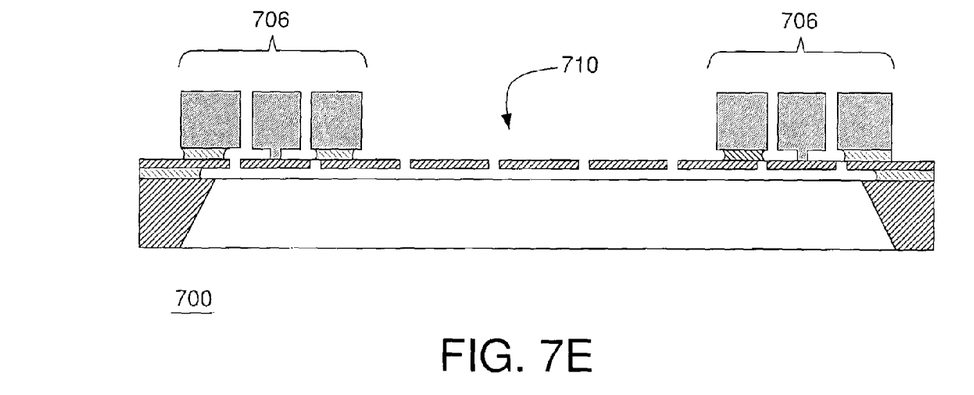

Referring to FIGS. 7D–E, first, portions of substrate layer 722 corresponding to segmented plate 710, movable portions 706A, and other movable parts (not shown) of device 700 such as serpentine springs, torsional members, and rods are removed, e.g., etched away. Then, portions of oxide layers 724 and 728 corresponding to all movable parts of device 700 are removed to release those movable parts. A thin layer of metal (not shown), e.g., gold, is optionally deposited over the segments of segmented plate 710 for better reflectivity.

In a representative implementation of device 700, layer thicknesses and element sizes may be as follows: 300 µm for layer 722, 0.5 µm for layer 724, 1 µm for layer 726, 1 µm for layer 728, 20 µm for layer 730, about 100×10 µm$^2$ (length×width) for each segment 710-i, about 1×2 µm$^2$ (cross-section) for serpentine springs.

Different etching techniques may be used to fabricate device 700 from the initial SOI wafer. It is known that silicon etches significantly faster than silicon oxide using, e.g., selective reactive ion etching (RIE). Similarly, silicon oxide etches significantly faster than silicon using, e.g., fluorine-based etchants. Additional layers of material (e.g., layers 728 and 730, FIGS. 7B–C) may be deposited onto an SOI wafer using, e.g., chemical vapor deposition. Various parts of device 700 may be mapped onto the corresponding layers using lithography. Current lithographic techniques are capable of defining details whose size is as small as about 0.25 microns. Additional description of various fabrication steps may be found in U.S. Pat. Nos. 6,201,631, 5,629,790, and 5,501,893, the teachings of which are incorporated herein by reference.

One application of MEMS devices having deformable membranes and/or segmented plates of the present invention is described in the above cited Nielson application. Briefly, Nielson teaches a dispersion compensator having a diffraction grating operating in reflection and optically coupled to a mirror array, in which different mirrors receive light corresponding to different communication channels. For each channel, a desired group delay value is produced by selecting the curvature of the corresponding mirror. A compensator employing independently addressable, variable-curvature mirrors, e.g., similar to segmented plate 610 of assembly 600 (FIG. 6), enables generation of variable, channel-specific group delays between about +400 and −400 ps/nm while maintaining transmission-band uniformity of better than about ±0.4 dB over a channel bandwidth of about 60 GHz.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although fabrication of MEMS devices of the invention has been described in the context of using silicon/silicon oxide SOI wafers, other suitable materials, such as germanium-compensated silicon, may similarly be used. The materials may be appropriately doped as known in the art. Various surfaces may be modified, e.g., by metal deposition for enhanced reflectivity and/or electrical conductivity or by ion implantation for enhanced mechanical strength. Differently shaped membranes, segments, actuators, rods, members, and/or electrodes may be implemented without departing from the scope and principle of the invention. Springs may have different shapes and sizes, where the term "spring" refers in general to any suitable elastic structure that can recover its original shape after being distorted. A different number and/or type of actuators may be used to deform membranes and/or springs. Various MEMS devices of the invention may be arrayed as necessary and/or apparent to a person skilled in the art.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A MEMS device, comprising:
   a deformable membrane movably connected to a support structure; and
   one or more actuators configured between the membrane and the support structure, each actuator adapted to apply torque to the membrane to change the shape of the membrane, wherein at least one of the one or more actuators is adapted to rotate a torsional member attached to the membrane about a longitudinal axis of said torsional member said rotation causing the torsional member to apply torque to the membrane.

2. The device of claim 1, wherein each actuator is configured to apply torque to a side of the membrane.

3. The device of claim 1, wherein, when the membrane is deformed by the one or more actuators, the membrane deformation provides a counteracting force for said actuators.

4. The device of claim 1, wherein:
the one or more actuators comprise four actuators grouped into two actuator pairs located at opposite sides of the membrane; and
each actuator pair has actuators located at a single side of the membrane.

5. The device of claim 1, wherein the one or more actuators include a first actuator, comprising a movable portion rotatably connected between the support structure and a first side of the membrane, wherein rotation of the movable portion generates torque for the first side of the membrane.

6. The device of claim 5, wherein the first actuator further comprises first and second electrodes fixedly attached to the support structure, wherein:
when a first voltage differential is applied between the movable portion and the first electrode, the movable portion rotates in a first direction; and
when a second voltage differential is applied between the movable portion and the second electrode, the movable portion rotates in a direction opposite to the first direction.

7. The device of claim 6, wherein the first actuator is a comb drive actuator.

8. The device of claim 5, wherein the movable portion is supported by first and second members, the first member connected between the movable portion and the support structure and the second member connected between the movable portion and the first side of the membrane, the first and second members defining an axis of rotation for the movable portion.

9. The device of claim 1, wherein the membrane has a reflective surface.

10. The device of claim 1, wherein the one or more actuators are configured to generate membrane displacement in either of two opposing directions along a membrane normal with respect to an initial membrane position.

11. The device of claim 1, wherein the membrane has at least two sections of different stiffness.

12. The device of claim 11, wherein the membrane has at least two sections of different thickness.

13. The device of claim 1, wherein the membrane comprises a serpentine spring.

14. The device of claim 1, further comprising a segmented plate attached to the membrane, wherein, when the membrane is deformed, at least one segment of the plate changes orientation.

15. The device of claim 14, wherein the segmented plate has a reflective surface.

16. The device of claim 14, wherein the membrane and the segmented plate are manufactured from a single layer of material.

17. The device of claim 14, wherein the membrane comprises two serpentine springs connected at opposite sides of the segmented plate.

18. The device of claim 1, wherein the device is part of a dispersion compensator.

19. A method of deforming a membrane in a MEMS device, comprising:
applying torque to the membrane using an actuator configured to change the shape of the membrane, wherein:
the membrane is movably connected to a support structure; and
one or more actuators are configured between the membrane and the support structure, each actuator adapted to apply torque to the membrane, wherein at least one of the one or more actuators is adapted to rotate a torsional member attached to the membrane about a longitudinal axis of said torsional member, said rotation causing the torsional member to apply torque to the membrane.

20. A MEMS device, comprising:
a deformable membrane movably connected to a support structure; and
means for applying torque to the membrane to change the shape of the membrane, said means configured between the membrane and the support structure, wherein the means for applying torque are adapted to rotate a torsional member attached to the membrane about a longitudinal axis of said torsional member, said rotation causing the torsional member to apply torque to the membrane.

21. The device of claim 1, wherein:
the deformable membrane has a side that determines thickness of the membrane; and
the torsional member is attached to said side.

22. The device of claim 1, wherein said rotation causes:
a first portion of the torsional member to apply a first force to a part of the membrane that is in contact with the first portion; and
a second portion of the torsional member to apply a second force to a part of the membrane that is in contact with the second portion, wherein the first and second forces have different directions.

23. The device of claim 1, wherein said rotation tends to twist the membrane about the longitudinal axis.

24. A MEMS device, comprising:
a deformable membrane movably connected to a support structure; and
one or more actuators configured between the membrane and the support structure, each actuator adapted to apply torque to the membrane to change the shape of the membrane, wherein:
the one or more actuators comprise four actuators grouped into two actuator pairs located at opposite sides of the membrane; and
each actuator pair has actuators located at a single side of the membrane.

25. A MEMS device, comprising:
a deformable membrane movably connected to a support structure; and
one or more actuators configured between the membrane and the support structure, each actuator adapted to apply torque to the membrane to change the shape of the membrane, wherein:
the one or more actuators include a first actuator, comprising a movable portion rotatably connected between the support structure and a first side of the membrane, wherein rotation of the movable portion generates torque for the first side of the membrane;
the first actuator further comprises first and second electrodes fixedly attached to the support structure, wherein:
when a first voltage differential is applied between the movable portion and the first electrode, the movable portion rotates in a first direction; and
when a second voltage differential is applied between the movable portion and the second electrode, the movable portion rotates in a direction opposite to the first direction; and
the first actuator is a comb drive actuator.

26. A MEMS device, comprising:
a deformable membrane movably connected to a support structure; and
one or more actuators configured between the membrane and the support structure, each actuator adapted to apply torque to the membrane to change the shape of the membrane, wherein the one or more actuators include a first actuator, comprising a movable portion rotatably connected between the support structure and a first side of the membrane, wherein:
- rotation of the movable portion generates torque for the first side of the membrane; and
- the movable portion is supported by first and second members, the first member connected between the movable portion and the support structure and the second member connected between the movable portion and the first side of the membrane, the first and second members defining an axis of rotation for the movable portion.

27. A MEMS device, comprising:
a deformable membrane movably connected to a support structure;
one or more actuators configured between the membrane and the support structure, each actuator adapted to apply torque to the membrane to change the shape of the membrane; and
a segmented plate attached to the membrane, wherein, when the membrane is deformed, at least one segment of the plate changes orientation, wherein the membrane comprises two serpentine springs connected at opposite sides of the segmented plate.

* * * * *

UNITED STATES PATENT AND TRADEMARK OFFICE
CERTIFICATE OF CORRECTION

| | |
|---|---|
| PATENT NO. | : 6,998,758 B2 |
| DATED | : February 14, 2006 |
| INVENTOR(S) | : Vladimir A. Aksyuk et al. |

It is certified that error appears in the above-identified patent and that said Letters Patent is hereby corrected as shown below:

<u>Title page,</u>
Item [57], ABSTRACT,
Line 7, replace "Membrane deformation causes the segments to change orientation and thereby change the shape of the minor." with -- Membrane deformation causes the segments to change orientation and thereby change the shape of the mirror --.

Signed and Sealed this

Eleventh Day of April, 2006

JON W. DUDAS
*Director of the United States Patent and Trademark Office*